UNITED STATES PATENT OFFICE.

BERTHOLD STEIN, OF NEW YORK, N. Y., ASSIGNOR TO DEHLS & STEIN, INC., OF NEW YORK, N. Y., A CORPORATION OF NEW YORK.

FODDER FOR HORSES AND OTHER ANIMALS.

No. 907,910.     Specification of Letters Patent.     Patented Dec. 29, 1908.

Application filed November 15, 1907. Serial No. 402,246.

*To all whom it may concern:*

Be it known that I, BERTHOLD STEIN, a subject of Germany, and a resident of New York city, in the county of New York and State of New York, have invented certain new and useful Improvements in Fodder for Horses and other Animals, of which the following is a specification.

The invention relates to a new food or fodder for horses and other animals.

It is well known that brewers' grains, regarded as a waste product of breweries, are fed to horses and cattle, and it is generally well understood that these grains having been deprived of a substantial portion of their food value do not afford sufficient nutriment and strength-giving qualities to enable animals fed on them to do hard work or withstand continued strains.

The object of this invention is with the use of a further waste product of breweries, to render the grain-fodder palatable, easily-digested and very nutritious, the fodder of my invention possessing all elements necessary for the maintaining and building-up of the systems of herbivorous animals.

My invention contemplates the use of brewers' grains, with additional ingredients, to-wit: peptone, phosphates and fats made or recovered from the yeast of breweries. While some uses for this yeast have heretofore been proposed, it is well-known that thousands of pounds of it daily go to waste.

My purpose is to utilize this yeast and add certain products derived from it to the grains, and thus not only avoid the great waste of yeast but render the grains not only suitable for but highly efficacious as fodder.

The yeast of breweries contains about fifty (50) per cent of albumen, but, in its natural condition, it is useless as fodder owing to its bitterness, due to the presence of hop-rosin and the lupulin contained therein. The hop-rosin and lupulin would prove to be detrimental to the well-being of horses and cattle if fed to them, and, further, should the yeast be fed to horses or other animals in its natural state, the fermentation would continue and cause serious stomach derangements and indigestion.

In accordance with my invention, I subject the yeast to a process for the production or recovery therefrom of peptone, phosphates and fats, and in carrying out this treatment I boil the yeast in the presence of water under pressure. The albumen of the yeast is by this boiling altered into peptone, soluble in water. The boiling is continued about three hours, and then the mixture is allowed to stand for a suitable period to cool and settle, after which the supernatant liquid which contains the peptone in solution, is drawn off and evaporated to dryness. The heavy residue from the original mixture contains phosphates, fats, and hop-rosin accompanied with lupulin. The phosphates and fats are, with the use of a fine-mesh sieve, separated from the hop-rosin and lupulin contained therein and dried at a moderate temperature, the lupulin and hop-rosin being caught by the sieve and wholly discarded. The dried peptone, phosphates and fats thus produced or recovered from the yeast are then, in powdered form, mixed with the dried brewers' grains, preferably with the addition of a suitable quantity of molasses, sirup or the like.

The fodder so manufactured represents a dry, loose substance, staple and unchanging under normal conditions, palatable, easily digested and very nutritious, differing greatly from a fodder consisting simply of brewers' grains or brewers' grains and yeast.

The fodder of my invention is not only new and highly efficient in food value but is produced mainly from the waste products of breweries and in its manufacture enables the use with great advantage of the yeast which while containing valuable ingredients has heretofore in enormous quantities been wasted.

I deem it very much better to recover the peptone, phosphates and fats from the yeast and add all of them to the grains, but I do not wish to limit my invention exclusively to the use in the fodder of the phosphates and fats, since the addition of said peptone alone to the brewers' grains will produce a vegetable peptone fodder of very desirable character.

What I claim as my invention and desire to secure by Letters Patent, is:

1. A vegetable fodder comprising dried brewers' grains and dry powdered peptone derived from brewers' yeast and separated from the hop-rosin and lupulin of the yeast, the whole being thoroughly mixed.

2. A vegetable fodder comprising dried brewers' grains, dry powdered peptone derived from brewers' yeast and separated from the hop-rosin and lupulin of the yeast, and molasses, the whole being thoroughly mixed.

3. A vegetable fodder comprising brewers' grains, and peptone, phosphates and fats derived from brewers' yeast and separated from the rosin and lupulin of the yeast.

4. A vegetable fodder comprising brewers' grains, and peptone, phosphates and fats derived from brewers' yeast and separated from the hop-rosin and lupulin of the yeast, with the addition of molasses.

5. The process of producing a fodder which consists in treating brewers' yeast to alter the albumen of the yeast into peptone, separating the peptone from the deleterious constituents of the yeast, and mixing the peptone thus derived with brewers' grains and molasses.

6. The process of producing a fodder which consists in treating brewers' yeast to alter the albumen of the yeast into peptone, separating the peptone and the phosphates and fats from the hop-rosin and lupulin of the yeast, and mixing the peptone, phosphates and fats thus derived with brewers' grains and molasses.

Signed at New York city in the county of New York and State of New York this 14th day of November A. D. 1907.

BERTHOLD STEIN.

Witnesses:
ARTHUR MARION,
CHAS. C. GILL.